United States Patent
Safaee

(10) Patent No.: US 10,356,861 B2
(45) Date of Patent: Jul. 16, 2019

(54) CONSTANT OUTPUT CURRENT LED DRIVER

(71) Applicant: Alireza Safaee, Danvers, MA (US)

(72) Inventor: Alireza Safaee, Danvers, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 84 days.

(21) Appl. No.: 15/478,360

(22) Filed: Apr. 4, 2017

(65) Prior Publication Data

US 2018/0288839 A1   Oct. 4, 2018

(51) Int. Cl.
| | |
|---|---|
| *H05B 41/28* | (2006.01) |
| *H05B 41/39* | (2006.01) |
| *H05B 33/08* | (2006.01) |
| *H02M 7/5387* | (2007.01) |
| *H02M 1/08* | (2006.01) |
| *H02M 1/14* | (2006.01) |
| *H02M 1/44* | (2007.01) |
| *H02M 3/337* | (2006.01) |
| *H02M 1/00* | (2006.01) |
| *H02M 7/48* | (2007.01) |

(52) U.S. Cl.
CPC .......... *H05B 33/083* (2013.01); *H02M 1/083* (2013.01); *H02M 1/14* (2013.01); *H02M 1/44* (2013.01); *H02M 3/337* (2013.01); *H02M 7/5387* (2013.01); *H05B 33/0815* (2013.01); *H05B 33/0845* (2013.01); *H02M 2001/0058* (2013.01); *H02M 2007/4815* (2013.01); *Y02B 20/348* (2013.01); *Y02B 70/1441* (2013.01); *Y02B 70/1491* (2013.01)

(58) Field of Classification Search
CPC ........................................................ B60Q 1/00
See application file for complete search history.

(56) References Cited

U.S. PATENT DOCUMENTS 6,034,489 A * 3/2000 Weng .................. H02M 1/4216
  315/209 R
8,723,487 B2  5/2014 Pahlevaninezhad et al.
(Continued)

OTHER PUBLICATIONS

Andreycak, Bill, "Zero Voltage Switching Resonant Power Conversion," Unitrode Application Note U-138, pp. 329-355, 1999, available at http://www.tij.co.jp/jp/lit/an/slua159/slua159.pdf.
(Continued)

*Primary Examiner* — Dedei K Hammond
(74) *Attorney, Agent, or Firm* — Yutian Ling

(57) ABSTRACT

A constant output current LED driver is disclosed. The driver is capable of operating with a wide range of input direct current (DC) voltage, and is configured with a full bridge inverter, an auxiliary circuit, and a voltage current converter. The full bridge inverter and auxiliary circuit collectively operate to provide a phase shift controller for the LED driver system. The LED driver operates under zero voltage switching (ZVS) for all switches in the LED driver circuit for all of the input voltage levels and for all of the output voltage levels. By maintaining ZVS in all conditions, the system can operate at very high frequency and be compact yet still achieve high power density. The resulting topology is applicable for a wide range of constant output current LED drivers. Switchable loads other than LEDs can also be driven.

20 Claims, 6 Drawing Sheets

(56) References Cited

U.S. PATENT DOCUMENTS

2011/0273909 A1* 11/2011 Christopher ........ H02M 3/3376
363/17
2011/0316430 A1* 12/2011 Cohen ............... H02M 3/33561
315/161

OTHER PUBLICATIONS

High-Brightness LED Matrix Manager for Automotive Headlight Systems, Texas Instruments, TPS92661-Q1, 2016, available at http://www.ti.com/lit/ds/symlink/tps92661-q1.pdf.
Waters, Duncan, International Search Report and Written Opinion of the International Searching Authority, for counterpart application PCT/US2018/024774, dated May 23, 2018, European Patent Office, Rijswijk, The Netherlands, 12 pages.

* cited by examiner

US 10,356,861 B2

CONSTANT OUTPUT CURRENT LED DRIVER

FIELD OF THE DISCLOSURE

The present disclosure relates to power supplies suitable for driving light emitting diode (LED) lighting systems, as well as other constant current electronic loads.

BACKGROUND

Strings of light emitting diodes (LEDs), such as those used in advanced automotive headlights, also referred to as "matrix" headlights, use an LED driver to control the brightness of the headlight. Pulse Width Modulation (PWM) dimming is often used to control the light pattern and brightness of the LED string. Each LED in the LED string is configured to be controlled individually in order to control the overall light pattern and brightness of the headlight. To implement PWM dimming a boost stage is generally used to boost the voltage, resulting in a two-stage system.

A typical LED driver that uses PWM dimming for each individual LED is shown in FIG. 1. The LEDs (D112, D114, . . . D118, D120) are connected in series as an LED string 110. Although four LEDs are illustrated in FIG. 1, any number of LEDs can be provided in the LED string 110. There is a bypass switch (S112, S114, . . . S118, S120) in parallel with each LED (respectively, D112, D114, . . . D118, D120) controlled by a controller 130. If a switch is open (e.g., S112), the voltage across the corresponding LED (e.g., D112) is greater than its threshold voltage, and thus the current flows through the LED and it emits light. On the other hand, when the switch is closed, the voltage across the corresponding LED is less than the threshold so the LED is turned off. By selecting the relative duration of the on and off times of the switches, the average brightness of each LED may be individually controlled.

DETAILED DESCRIPTION

Figure 1:
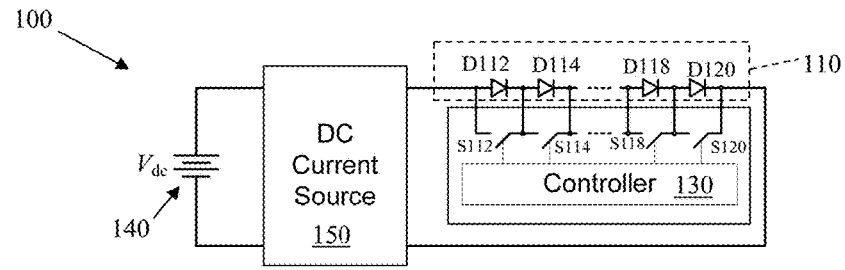
FIG. 1 illustrates a block diagram of an LED driver system having a direct current (DC) current source which provides for PWM dimming of each LED in an LED string.

A constant output current power supply, or driver, is disclosed. The driver is capable of operating with a wide range of input direct current (DC) voltages, and is particularly well-suited for powering switchable LED strings, but can also be used with other switchable load types as will be appreciated in light of this disclosure. In accordance with an embodiment, the driver includes a full bridge inverter, an auxiliary circuit, and a voltage current converter. The driver operates under zero voltage switching (ZVS) for all switches in the driver circuit for all of the input voltage levels and for all of the output power levels. By maintaining ZVS in all output voltage conditions, the system may operate at very high frequencies and be compact yet still achieve high power density. The resulting topology is applicable for a wide range of constant output current drivers. The full bridge inverter uses a phase shift modulation scheme and, together with the voltage current converter, provides a constant output current to one LED string (or other switchable load). The phase shift modulation controller operates such that the main harmonic of the voltage appearing across the AC nodes of the full bridge inverter is kept constant. The phase shift modulation controller decreases the phase shift ($\varphi$) as the input DC voltage increases, and likewise increases the phase as the input voltage decreases. This configuration may be used to provide constant first harmonic voltage to the voltage-current converter block. The auxiliary circuit may operate with ZVS in all input voltage conditions.

General Overview

Implementing a constant current driver system using PWM involves a number of non-trivial issues, particularly in a switchable LED string application. For example, a typical LED driver architecture for automotive headlight systems includes two stages of conversion, a boost converter stage followed by one or more buck converters. The current source is implemented using a feedback and controller of the buck stage. Therefore the dynamic behavior of the buck stage determines how fast the LED may be switched by the matrix manager unit. When an additional LED is turned on, the current drops until the controller reacts and pushes the current up again. And when an LED is turned off (i.e., the corresponding switch being turned on) the current suddenly goes up until the feedback reduces it back to the desired level. The dynamics of the control has an impact on the quality of the light (e.g., over- and undershoots in light output) of all the LEDs, not only the one being switched. For the buck converter to act as a current source feeding a string of LEDs (e.g., N switchable LEDs connected in series, where N=12 or some other suitable number), there is a need to have a prior boost stage, particularly in applications with potentially relatively low input DC voltages. The boost stage ensures that the buck input voltage is always beyond the total voltage of LEDs. Buck and boost converters are very well established and there are many low-cost controllers and components available for them. In any case, such typical circuits are hard switching topologies which limit the high frequency operation and high power density designs. The voltage stress across the switches can be large which, leading to the use of switches with higher voltage ratings and therefore higher cost and conduction losses. Also, collecting feedback to generate current source behavior has several practical limitations. Moreover, in a typical automotive application the battery voltage can vary greatly. For example, for a nominal 12V battery system the headlights operate with no derating for the DC voltages from 8 to 24 volts and with derating down to 6 or up to 28 volts. Therefore there is a need for single stage compact and reliable drivers, and particularly drivers for LED-based automotive headlights with many individually-dimmable LEDs.

Circuit Architecture

Figure 2:
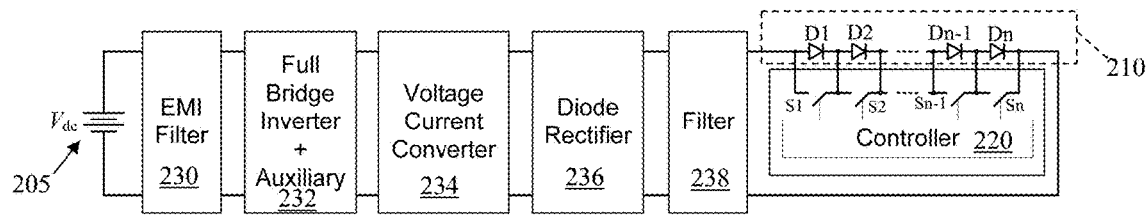
FIG. 2 illustrates a block diagram of an LED driver system configured in accordance with an embodiment of the present disclosure.

FIG. 2 illustrates a block diagram of a single stage LED driver system configured in accordance with an example embodiment of the present disclosure. As can be seen, the system includes a full bridge inverter and auxiliary circuit block 232 and a voltage-current converter 234. An electromagnetic interference (EMI) filter 230 is provided between block 232 and a DC voltage source 205. In addition, a diode rectifier 236 and filter 238 are between the voltage-current converter 234 and the LED string 210. As can be further seen, the LEDs of the LED string 210 are switchable, and a controller 220 is used to control the switches. Block 232 operates to provide a phase shift modulated AC voltage with a constant first harmonic to the voltage-current converter 234. The example embodiment overcomes disadvantages of conventional two-stage system by providing a single stage converter capable of operating with wide input voltage and zero voltage switching (ZVS) and low voltage stress across the switches.

Power is provided to the LED driver system by DC voltage source 205, in this example embodiment. The LED driver system provides power to the LEDs (D1, D2, . . . Dn-1, Dn) in LED string 210. Each LED has a respective switch (S1, S2, . . . Sn-1, Sn) under control of the controller 220. Note that a given string may include any number of LEDs, as denoted by Dn.

The EMI filter block 230 eliminates the high frequency current components exchanged with the DC power source 205, which can cause interference with other electrical systems, particularly in a vehicle or other complex system with several electrical components and interconnections. In other embodiments, the EMI block 230 may not be needed, depending on the EMI sensitivity of the given application. Any suitable EMI circuitry can be used here, whether it be custom or proprietary, as will be appreciated.

Figure 3:
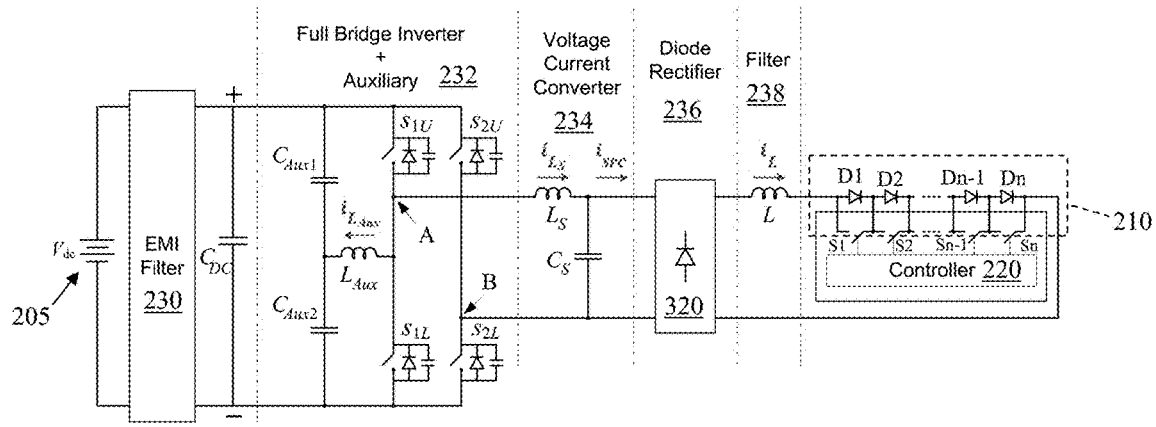
FIG. 3 illustrates a schematic diagram of the full bridge inverter, the auxiliary circuit and the voltage-current converter of FIG. 2, configured in accordance with an embodiment of the present disclosure.

The full bridge inverter and auxiliary circuit block 232 is shown and described as a single block, but note that it may be implemented as distinct circuits. Further details regarding block 232 are shown in FIG. 3. The full bridge inverter portion of block 232 has the main function of converting the input signal from the DC voltage source 205 to a quasi-square AC waveform using a phase-shift modulation scheme, explained in detail below. The auxiliary circuit of block 232 has the function of maintaining zero voltage switching (ZVS) for all the output voltage conditions of the circuit. The auxiliary circuit also reduces the current in the leading leg of the full bridge inverter at higher voltage levels.

The voltage-current converter block 234 is a passive circuit which generates AC current proportional to the fundamental harmonic of the voltage generated by the full bridge inverter of block 232. The diode bridge rectifier 236 rectifies the AC current from the voltage-current converter 234 and the filter circuit 238 reduces the ripple content of the rectified output current for LEDs in the LED string 210.

FIG. 3 illustrates a further detailed schematic diagram of the block diagram shown in FIG. 2. As can be seen, the full bridge inverter portion of block 232 includes two switch legs, the leading leg denoted by symbol A (with switches $S_{1U}$ and $S_{1L}$) and the lagging leg denoted by symbol B (with switches $S_{2U}$ and $S_{2L}$). All four switches operate at constant frequency $f_{SW}$ and are on for 50% of the time (disregarding the short dead-time to avoid shoot-through, during which switches from both legs are on, which would cause an undesirable short-circuit condition). The auxiliary circuit of block 232 includes two capacitors $C_{Aux1}$ and $C_{Aux2}$ and inductor $L_{Aux}$. Each switch symbol in block 232 (for example $S_{1U}$) includes the switch in parallel with a diode and a capacitor. In some embodiments, the switching component can include the body diode of the switch and the internal capacitor of the switch. The diode rectifier 236 includes one or more diodes 320 that rectify the AC current from the voltage-current converter 234. The inductor L in the filter circuit 238 has two functions: a) it ensures the continuity of the current $i_{src}$ in block 234, and b) reduces the ripple content of the rectified output current for LEDs in the LED string 210.

Figure 4:
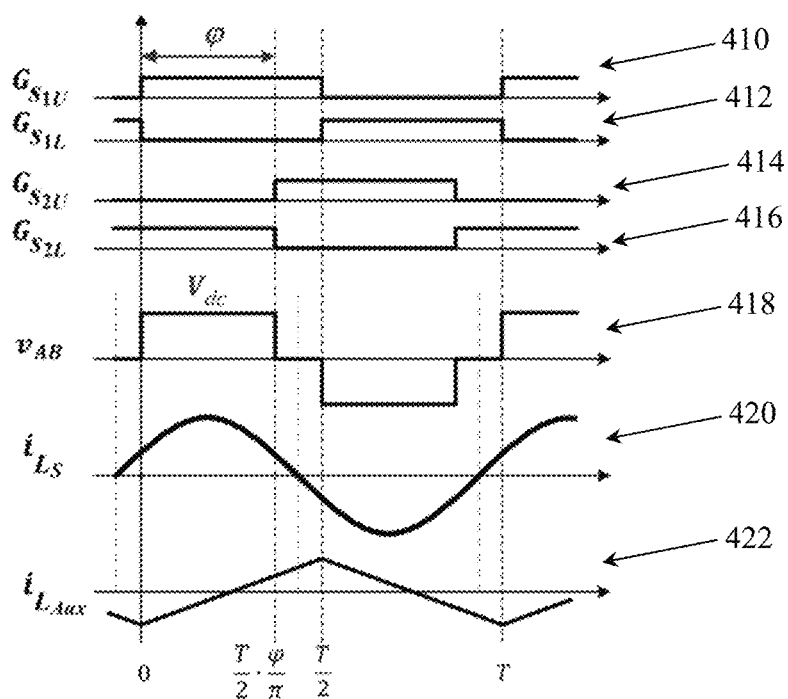
FIG. 4 illustrates a graphical diagram of example waveforms for the various components of the system using a phase shift modulation scheme.

The main waveforms of the driver system are illustrated in FIG. 4, and will further assist in explaining operation of the circuitry shown in FIG. 3. Waveform 410 shows the gate signal of switch $S_{1U}$, waveform 412 shows the gate signal of switch $S_{1L}$, waveform 414 shows the gate signal of switch $S_{2U}$, waveform 416 shows the gate signal of switch $S_{2L}$, waveform 418 shows the $v_{AB}$ waveform of the voltage between nodes A and B in FIG. 3, waveform 420 shows the current of the inductor $L_S$ ($i_{L_S}$) in the voltage current converter 234, and waveform 422 shows the current of the auxiliary inductor ($i_{L_{Aux}}$). The phase shift ($\varphi$) between the waveform of the two legs in block 232 is determined by a phase shift modulation controller such that the fundamental harmonic of the waveform $v_{AB}$ is kept constant. In other words, as $v_{dc}$ 205 increases, the phase shift controller decreases $\varphi$, and as $v_{dc}$ decreases, the phase shift modulation controller increases the $\varphi$. The voltage of node A, $v_A$, is a complete square waveform and therefore the current in $L_{Aux}$ has a triangular waveform 422 in synchronization with $v_A$. This current has a negative value at the rising edge of $v_A$ and helps to provide ZVS for the leading leg. The lagging leg does not need an auxiliary circuit for ZVS.

The voltage-current converter block 234 includes inductor $L_S$ and capacitor $C_S$ tuned at the switching frequency $f_{SW}$. This arrangement acts as an AC current source which keeps its output current $i_{src}$ proportional to the first harmonic of $v_A$ that is kept constant by the aforementioned phase shift modulation controller. This current is rectified by the full bridge diode rectifier 236. Inductor L of the filter circuit 238 has two functions: it reduces the ripple content of the rectified output current for better light out of the LEDs and also ensures that the rectifier diodes conduct fully to guarantee the continuity of $i_{src}$. Because of the high impedance of the combination of $L_S$ and $C_S$ the higher harmonics of the current in $L_S$ are negligible. Note that, as shown in FIG. 4, $i_{L_S}$ waveform 420 is in phase with $v_{AB}$ waveform 418. Also, the rising zero crossing of $i_{L_S}$ waveform 420 happens before rising edge of $v_{AB}$ waveform 418. A negative current from the auxiliary circuit is provided so the net current leaving node A at the rising edge of $v_{AB}$ remains negative and ZVS of the leading leg is maintained.

Another aspect of the driver circuit is that at higher $v_{dc}$ the width of the waveform 418 $v_{AB}$ gets narrower to keep the fundamental harmonic of $v_{AB}$ constant. The consequence of the narrower $v_{AB}$ is that, as shown in the waveform 420, $i_{L_S}$ is more leading in respect to $i_{L_{Aux}}$. Therefore a larger portion of $i_{L_S}$ goes to $L_{Aux}$ instead of passing through the leading leg switches $S_{1U}$ and $S_{1L}$ and this reduces the conduction loss in them. The current leaving node B of the lagging leg is always negative at the rising edge of $v_B$ thus the ZVS property is always maintained.

The positive portion of the DC bus is represented by a positive rail (+) denoted at a topmost side of a DC capacitor ($C_{DC}$) and a negative portion of the DC bus represented by a negative rail (−) denoted at the bottommost side of the DC capacitor ($C_{DC}$). Because of the almost sinusoidal waveform 420 of $i_{L_S}$ the AC current injected to the DC bus of the full bridge inverter of block 232 has low higher level harmonic content. This reduces the size of $C_{DC}$ as well as the rating of the EMI filter block 230. To further reduce the size of the DC bus capacitor, a parallel branch including an inductor and a capacitor tuned at the switching frequency can be added to the circuit (parallel to the DC capacitor). Such a branch provides a low impedance path for the main harmonic of the ripple current injected to the DC bus, with no or otherwise negligible impact on the other functions of the system. Shrinking the size of these elements contributes considerably in having a more compact design and increasing the power density of the system.

Figure 5:
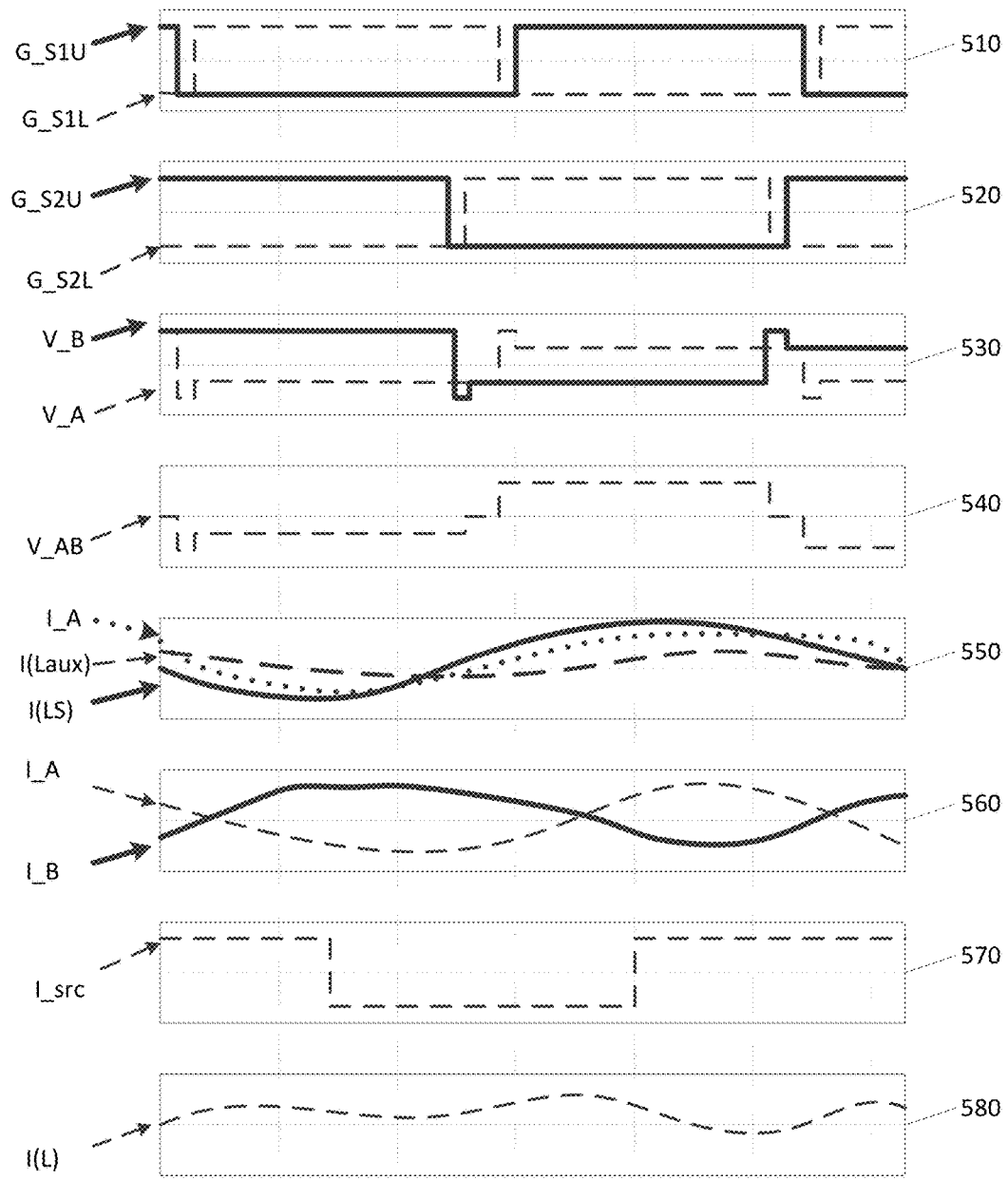
FIG. 5 illustrates a graphical diagram of example waveforms of the voltage-current converter simulated using a simulation software environment for a DC power voltage of 8V.
Figure 6:
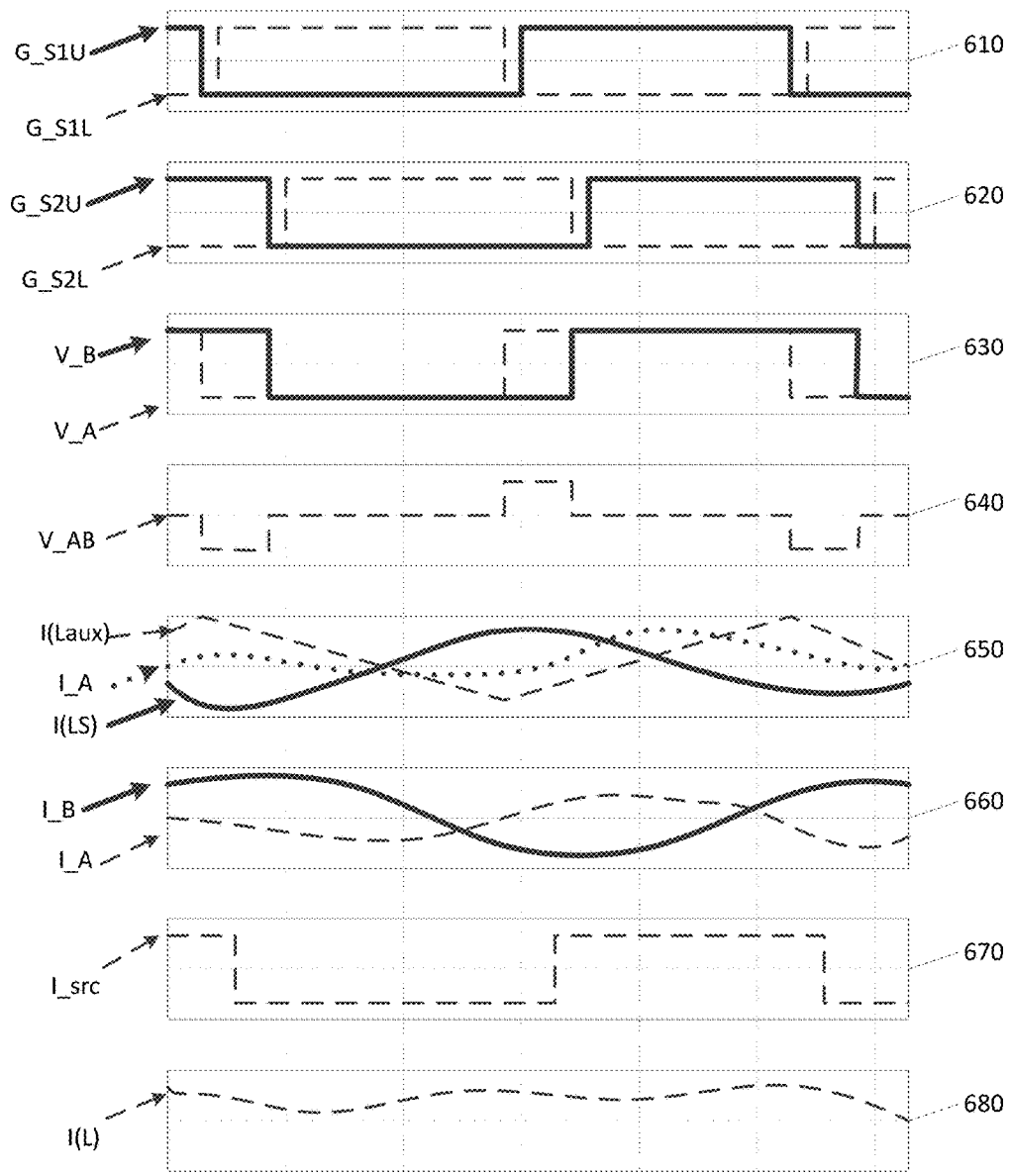
FIG. 6 illustrates a graphical diagram of example waveforms of the voltage-current converter simulated using a simulation software environment for a DC power voltage of 24V.

FIG. 5 and FIG. 6 show the major waveforms of the converter simulated in a simulation software environment for two extreme cases with $V_{dc}$ of 8 and 24 volts, respectively. Graphs 510, 520, 530, 540, 540, 550, 560, 570 and 580 show various major waveforms with the $V_{dc}$ of eight volts. Graph 510 shows the gate voltage of the switching circuit $S_{1U}$ (G_S1U—shown in solid line) and of the switching circuit $S_{1L}$ (G_S1L—shown in dotted line); graph 520 shows the gate voltage of the switching circuit $S_{2U}$ (G_S2U—shown in solid line) and of the switching circuit $S_{2L}$ (G_S2L—shown in dotted line); graph 530 shows the voltage of node B (V_B) and the voltage of node A (v_A); graph 540 shows the voltage difference between the voltage of node B and the voltage of node A (V_AB); graph 550 shows the current of the node A (I_A), the current of the auxiliary inductor (I(Laux)) and the current of the inductor of the voltage-current converter (I(LS)); graph 560 shows the current of node A (I_A) and the current of node B (I_B); graph 570 shows the source current (I_src) and graph 580 shows the current on the LED driver (I(L)). Graphs 610, 620, 630, 640, 650, 660, 670 and 680 show various major waveforms with the $V_{dc}$ of 24 volts. Graph 610 shows the gate voltage of the switching circuit Siu (G_S1U—shown in solid line) and of the switching circuit $S_{1L}$ (G_S1L—shown in dotted line); graph 620 shows the gate voltage of the switching circuit $S_{2U}$ (G_S2U—shown in solid line) and of the switching circuit $S_{2L}$ (G_S2L—shown in dotted line); graph 630 shows the voltage of node B (v_B) and the voltage of node A (v_A); graph 640 shows the voltage difference between the voltage of node B and the voltage of node A (V_AB); graph 650 shows the current of the node A (I_A), the current of the auxiliary inductor (I(Laux)) and the current of the inductor of the voltage-current converter (I(LS)); graph 660 shows the current of node A (I_A) and the current of node B (I_B); graph 670 shows the source current (I_src) and graph 680 shows the current on the LED driver (I(L)).

The average of $i_L$ (graph 580 in FIG. 5, graph 680 in FIG. 6) is about 1A in both cases. In both the cases, at the rising edge of $v_{AB}$ (which is the same as rising edge of $v_A$), shown in graph 540 of FIG. 5 and graph 640 of FIG. 6, the value of $i_{L_S}$ (shown in graph 550 in FIG. 5, and graph 650 in FIG. 6) is positive but at this moment $i_{L_{Aux}}$ (also shown in graph 550 in FIG. 5 and graph 650 in FIG. 6) is negative enough to make $i_A = i_{L_S} i_{L_{Aux}}$ negative to maintain ZVS in the leading leg. Also in both the cases, at the rising edge of $v_B$ (shown in graph 530 of FIG. 5 and graph 630 of FIG. 6) the value of $i_B$ is negative so ZVS of the lagging leg is maintained. Note that in the case of $V_{dc}$=24V (FIG. 6) the rms value of $i_A$ is considerably reduced compared to the case of $V_{dc}$=8V (FIG. 5).

Figure 7:
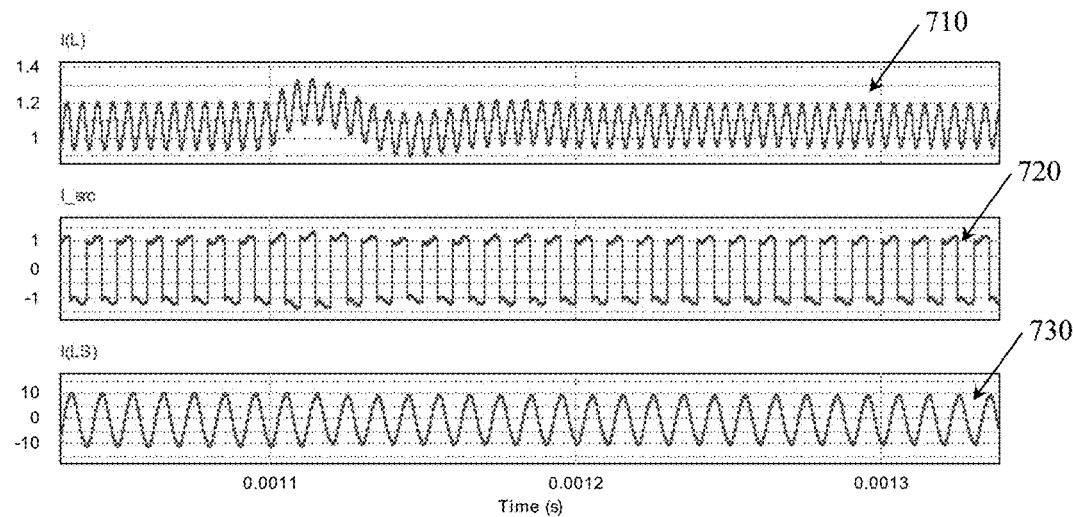
FIG. 7 illustrates a graphical diagram showing the effect on the LED current, the source current, and an inductor of the voltage current converter, when transitioning from twelve illuminated LEDs to eleven illuminated LEDs.
Figure 8:
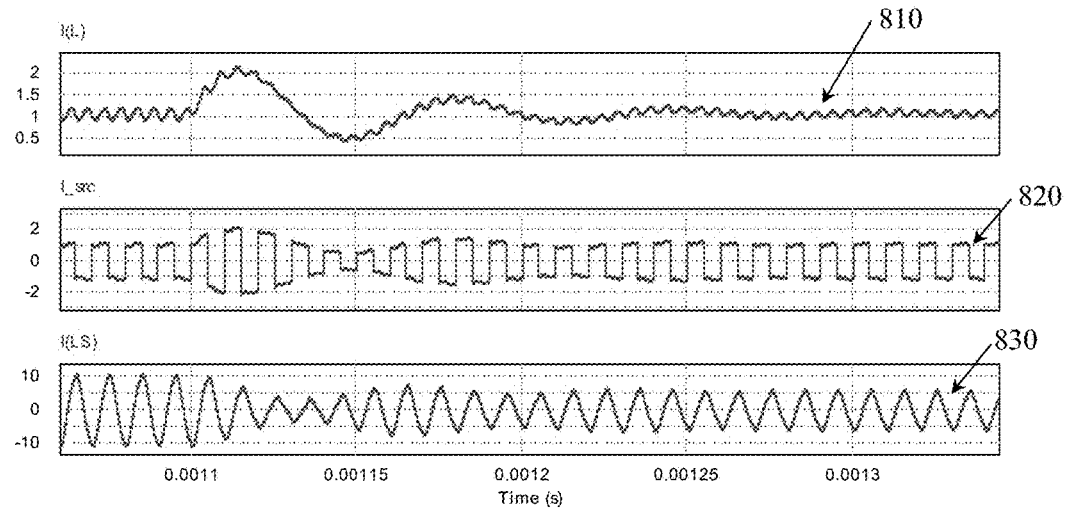
FIG. 8 illustrates a graphical diagram showing the effect on the LED current, the source current, and an inductor of the voltage current converter, when transitioning from twelve illuminated LEDs to six illuminated LEDs.

FIG. 7 illustrates a graphical diagram showing the effect on the LED current ($i_L$), the source current ($i_{src}$), and the current of an inductor of the voltage-current converter ($i_{L_S}$), when transitioning from twelve illuminated LEDs to eleven illuminated LEDs. FIG. 8 illustrates a graphical diagram showing the effect on the LED current ($i_L$), the source current ($i_{src}$), and an inductor of the voltage-current converter ($i_{L_S}$), when transitioning from twelve illuminated LEDs to six illuminated LEDs.

In both FIG. 7 and FIG. 8, the LED current $i_L$ (shown by graph 710 in FIG. 7, and graph 810 of FIG. 8) settles down to its nominal value in less than 10 cycles. Graph 710 shows the LED current $i_L$ when transitioning from twelve illuminated LEDs to eleven illuminated LEDs, graph 720 shows the source current $i_{src}$ when transitioning from twelve illuminated LEDs to eleven illuminated LEDs, and graph 730 shows the current of an inductor of the voltage-current converter ($i_{L_S}$) when transitioning from twelve illuminated LEDs to eleven illuminated LEDs. Graph 810 shows the LED current $i_L$ when transitioning from twelve illuminated LEDs to six illuminated LEDs, graph 820 shows the source current $i_{src}$ when transitioning from twelve illuminated LEDs to six illuminated LEDs, and graph 830 shows the current of an inductor of the voltage-current converter ($i_{L_S}$) when transitioning from twelve illuminated LEDs to six illuminated LEDs.

The advantages of systems according to some embodiments of the present disclosure should be apparent in light of this disclosure. For instance, some possible advantages include a single stage of conversion (rather than two-stages of conversion); wide DC input voltage range (e.g., 8 to 24 volts), voltage boosting functionality (out of the current source nature of voltage-current converter circuit) with no extra boost stage needed; ZVS for all the switches, for all input voltage values and output power values (full load to zero load), thereby allowing for high frequency operation with no or little sacrifice in efficiency; small size and low-cost passive components; constant output current behavior, no need for a controller to intervene when LEDs turn on or off; low harmonic content in the input currents and small EMI filter components; equal or otherwise more balanced utilization of switches; switch voltage stresses limited to input DC voltage level, thereby allowing the use of lower voltage switches which have a lower cost and/or smaller on-state resistance and hence lower conduction losses; wide range of off-the-shelf options for the LED switches; reduced current in the leading leg switches at higher input DC voltages; and high reliability due to a reduced component count. Note that not all embodiments of the present disclosure may lead to all of these various advantages, and numerous configurations and variations will be apparent in light of this disclosure.

Figure 9:
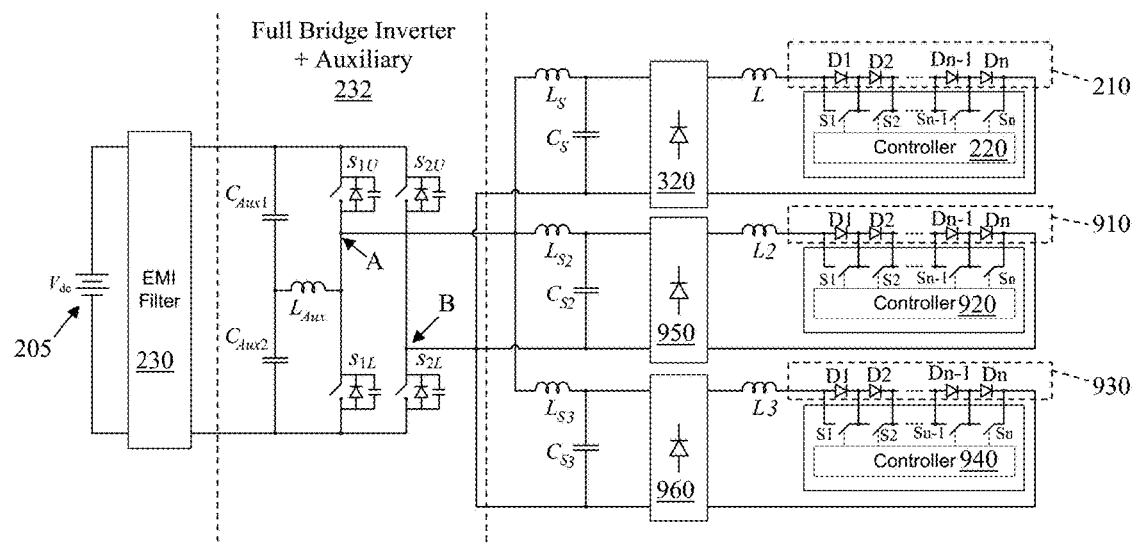
FIG. 9 illustrates a schematic diagram of a full bridge inverter and an auxiliary circuit of FIG. 3, and further expanded to accommodate multiple LED chains, in accordance with an embodiment of the present disclosure.

FIG. 9 includes the schematic diagram of FIG. 3 which has been extended to accommodate three LED chains (210, 910, and 930) with their controllers (230, 920 and 940, respectively) totally independent of each other. Sharing the AC source voltage $v_{AB}$ allows the three LED chains to be driven with only one full bridge converter and auxiliary block 232 and reduces the total cost compared to a configuration having three instances of the circuit shown in FIG. 3. Note that only a single full bridge inverter and auxiliary circuit stage 232 is used to feed three separate voltage current converters, which greatly reduces the overall component count of the LED driver system. A first voltage-current converter is comprised of $L_S$ and $C_S$, a second voltage-current converter is comprised of $L_{S2}$ and $C_{S2}$, and a third voltage-current converter is comprised of $L_{S3}$ and $C_{S3}$. Thus, a single full bridge inverter and auxiliary circuit block 232 with the three voltage current converters and three associated diode bridges 320, 950 and 960, together drive three LED strings 310, 910, and 930, respectively, using a system that has a reduced total number of components relative to conventional architectures, while achieving constant current for all output voltage conditions of the circuit. Note that "constant current" as used herein is not intended to imply a literal constant current; rather, reference to constant current is intended to be a current that varies only within a given tolerance that is relatively small, such as a +/−10% variation, or a +/−5% variation, or a +/−2% variation, or a +/−1% variation, or a +/−0.5% variation. Further note that the tolerance may be asymmetric in some cases. In a more general sense, the tolerance of the constant current may vary from one embodiment to the next, depending on the given application.

Numerous variations and configurations will be apparent in light of this disclosure. For example, one example embodiment of the present disclosure provides a power supply system having a full bridge inverter, an auxiliary circuit, a voltage-current converter and a diode bridge. The full bridge inverter may be configured to convert energy from a DC power source to an AC voltage waveform using phase-shift modulation, the full bridge inverter having a leading leg and a lagging leg. The auxiliary circuit may be configured to maintain zero voltage switching of the switches in the leading leg for all output voltage conditions of the power supply system. The voltage-current converter may be configured to generate an AC current that is proportional to a fundamental harmonic of the AC voltage waveform generated by the full bridge inverter. The diode bridge may be configured to rectify the AC current from the voltage-current converter and produce a rectified output current. In some cases, the power supply system includes a filter configured to reduce ripple content of the rectified output current. In some cases, the full bridge inverter and the auxiliary circuit collectively operate to provide a phase shift modulated AC waveform between the AC nodes of the leading leg and the lagging leg of the full bridge inverter. In some cases, the leading leg includes a first top switch and a first bottom switch, and the lagging leg includes a second top switch and a second bottom switch. In some cases, all the switches operate with the same switching frequency. In some cases, the voltage-current converter includes a first inductor and a first capacitor that are tuned to the switching frequency. In some cases, the auxiliary circuit includes two auxiliary capacitors connected in series and an auxiliary inductor having one of it terminals connected between the two auxiliary capacitors. In some cases, the full bridge inverter, the auxiliary circuit, and the voltage-current converter together act as an AC current source with its output AC current to be rectified and filtered to feed a light emitting diode (LED) string. In some cases, the power supply system further includes one or more light emitting diode (LED) strings, and each LED string shares the full bridge inverter to draw power from the DC power source. In some cases, the power supply system also includes a second voltage-current converter configured to generate a second AC current that is proportional to the fundamental harmonic of the AC voltage waveform generated by the full bridge inverter, and a second diode bridge that is configured to rectify the second AC current from the second voltage-current converter and produce a second rectified output current.

Another example embodiment of the present disclosure provides a method of delivering constant current from a DC power source. The method includes converting, by a full bridge inverter, DC power provided by the DC power source into an AC voltage waveform with a constant first harmonic using phase-shift modulation; maintaining, by an auxiliary circuit that is operatively connected to the full bridge inverter, zero voltage switching (ZVS) for all output voltage conditions; generating, by a voltage-current converter that is operatively connected to the full bridge inverter, an AC current that is proportional to a fundamental harmonic of the AC voltage waveform generated by the full bridge inverter; and rectifying, by a diode bridge that is operatively connected to the voltage-current converter, the AC current to produce a rectified output current. In some cases, the full bridge inverter comprises a leading leg having a first top switch and a first bottom switch, and a lagging leg having a second top switch and a second bottom switch that all operate at the same switching frequency. In some cases, the auxiliary circuit is further configured to reduce the current in the leading leg of the full bridge inverter. In some cases, the method further includes reducing, by a filter circuit, ripple content of the rectified output current from the diode bridge. In some cases, the method further includes providing a low impedance path for a main harmonic of the ripple content by a branch inductor and a branch capacitor in parallel with a capacitor of the voltage-current converter. In some cases, the method further includes filtering, by an electromagnetic interference (EMI) filter, high frequency current components of the DC power from the DC power source before the full bridge invert converts the DC power into the AC voltage waveform.

In another example embodiment of the present disclosure, a light emitting diode (LED) driver for driving one or more LEDs in an LED string includes a full bridge inverter, an auxiliary circuit, a voltage-current converter, and a diode bridge. The full bridge inverter can be configured to convert a signal from a DC power source to an AC waveform using phase-shift modulation. The auxiliary circuit can be configured to maintain zero voltage switching for all output voltage conditions of the driver. The voltage-current converter can be configured to generate an AC current that is proportional to a fundamental harmonic of the AC waveform generated by the full bridge inverter. The diode bridge can be configured to rectify the AC current and produce a rectified output current. In some cases, the full bridge inverter includes a leading leg having a first top switch and a first bottom switch, and a lagging leg having a second top switch and a second bottom switch. In some cases, the voltage-current converter includes a first inductor and a first capacitor that are tuned to a switching frequency. In some cases, the LED driver further includes a second voltage-current converter configured to generate a second AC current that is proportional to the fundamental harmonic of the AC voltage waveform generated by the full bridge inverter, and a second diode bridge that is configured to rectify the second AC current from the second voltage-current converter and produce a second rectified output current.

The foregoing description of the embodiments of the disclosure has been presented for the purposes of illustration and description. It is not intended to be exhaustive or to limit the disclosure to the precise form disclosed. Many modifi-

What is claimed is:

1. A power supply system, comprising:
a full bridge inverter configured to convert energy from a direct current (DC) power source to an alternating current (AC) voltage waveform using phase-shift modulation, the full bridge inverter having a leading leg and a lagging leg;
an auxiliary circuit configured to maintain zero voltage switching of one or more switches in the leading leg for all output voltage conditions of the power supply system;
a voltage-current converter configured to generate an AC current that is proportional to a fundamental harmonic of the AC voltage waveform generated by the full bridge inverter; and
a diode bridge that is configured to rectify the AC current from the voltage-current converter and produce a rectified output current.

2. The power supply system of claim 1 further comprising:
a filter configured to reduce ripple content of the rectified output current.

3. The power supply system of claim 1, wherein the full bridge inverter and the auxiliary circuit collectively operate to provide a phase shift modulated AC waveform between AC nodes of the leading leg and the lagging leg of the full bridge inverter.

4. The power supply system of claim 1, wherein the leading leg comprises a first top switch and a first bottom switch, and the lagging leg comprises a second top switch and a second bottom switch.

5. The power supply system of claim 4, where all the switches operate with the same switching frequency.

6. The power supply system of claim 5, wherein the voltage-current converter comprises a first inductor and a first capacitor that are tuned to the switching frequency.

7. The power supply system of claim 1, wherein the auxiliary circuit includes two auxiliary capacitors connected in series and an auxiliary inductor having one of it terminals connected between the two auxiliary capacitors.

8. The power supply system of claim 1, wherein the full bridge inverter, the auxiliary circuit, and the voltage-current converter together act as an AC current source with its output AC current to be rectified and filtered to feed a light emitting diode (LED) string.

9. The power supply system of claim 1, further comprising one or more light emitting diode (LED) strings, and wherein each LED string shares the full bridge inverter to draw power from the DC power source.

10. The power supply system of claim 1, further comprising:
a second voltage-current converter configured to generate a second AC current that is proportional to the fundamental harmonic of the AC voltage waveform generated by the full bridge inverter; and
a second diode bridge that is configured to rectify the second AC current from the second voltage-current converter and produce a second rectified output current.

11. A method of delivering constant current from a DC power source, the method comprising:
converting, by a full bridge inverter, DC power provided by the DC power source into an AC voltage waveform with a constant first harmonic using phase-shift modulation;
maintaining, by an auxiliary circuit that is operatively connected to the full bridge inverter, zero voltage switching (ZVS) for all output voltage conditions;
generating, by a voltage-current converter that is operatively connected to the full bridge inverter, an AC current that is proportional to a fundamental harmonic of the AC voltage waveform generated by the full bridge inverter; and
rectifying, by a diode bridge that is operatively connected to the voltage-current converter, the AC current to produce a rectified output current.

12. The method of claim 11, wherein the full bridge inverter comprises a leading leg having a first top switch and first a bottom switch, and a lagging leg having a second top switch and a second bottom switch that all operate at the same switching frequency.

13. The method of claim 12, wherein the auxiliary circuit is further configured to reduce the current in the leading leg of the full bridge inverter.

14. The method of claim 11, further comprising:
reducing, by a filter circuit, ripple content of the rectified output current from the diode bridge.

15. The method of claim 14, further comprising:
providing a low impedance path for a main harmonic of the ripple content by a branch inductor and a branch capacitor in parallel with a capacitor of the voltage-current converter.

16. The method of claim 11, further comprising:
filtering, by an electromagnetic interference (EMI) filter, high frequency current components of the DC power from the DC power source before the full bridge invert converts the DC power into the AC voltage waveform.

17. A light emitting diode (LED) driver for driving one or more LEDs in an LED string, the LED driver comprising:
a full bridge inverter configured to convert a signal from a DC power source to an AC waveform using phase-shift modulation;
an auxiliary circuit configured to maintain zero voltage switching for all output voltage conditions of the driver;
a voltage-current converter configured to generate an AC current that is proportional to a fundamental harmonic of the AC waveform generated by the full bridge inverter; and
a diode bridge configured to rectify the AC current and produce a rectified output current.

18. The LED driver of claim 17, wherein the full bridge inverter comprises a leading leg having a first top switch and a first bottom switch, and a lagging leg having a second top switch and a second bottom switch.

19. The LED driver of claim 17, wherein the voltage-current converter includes a first inductor and a first capacitor that are tuned to a switching frequency.

20. The LED driver of claim 17, further comprising:
a second voltage-current converter configured to generate a second AC current that is proportional to the fundamental harmonic of the AC voltage waveform generated by the full bridge inverter; and
a second diode bridge that is configured to rectify the second AC current from the second voltage-current converter and produce a second rectified output current.

* * * * *